Figure 1:
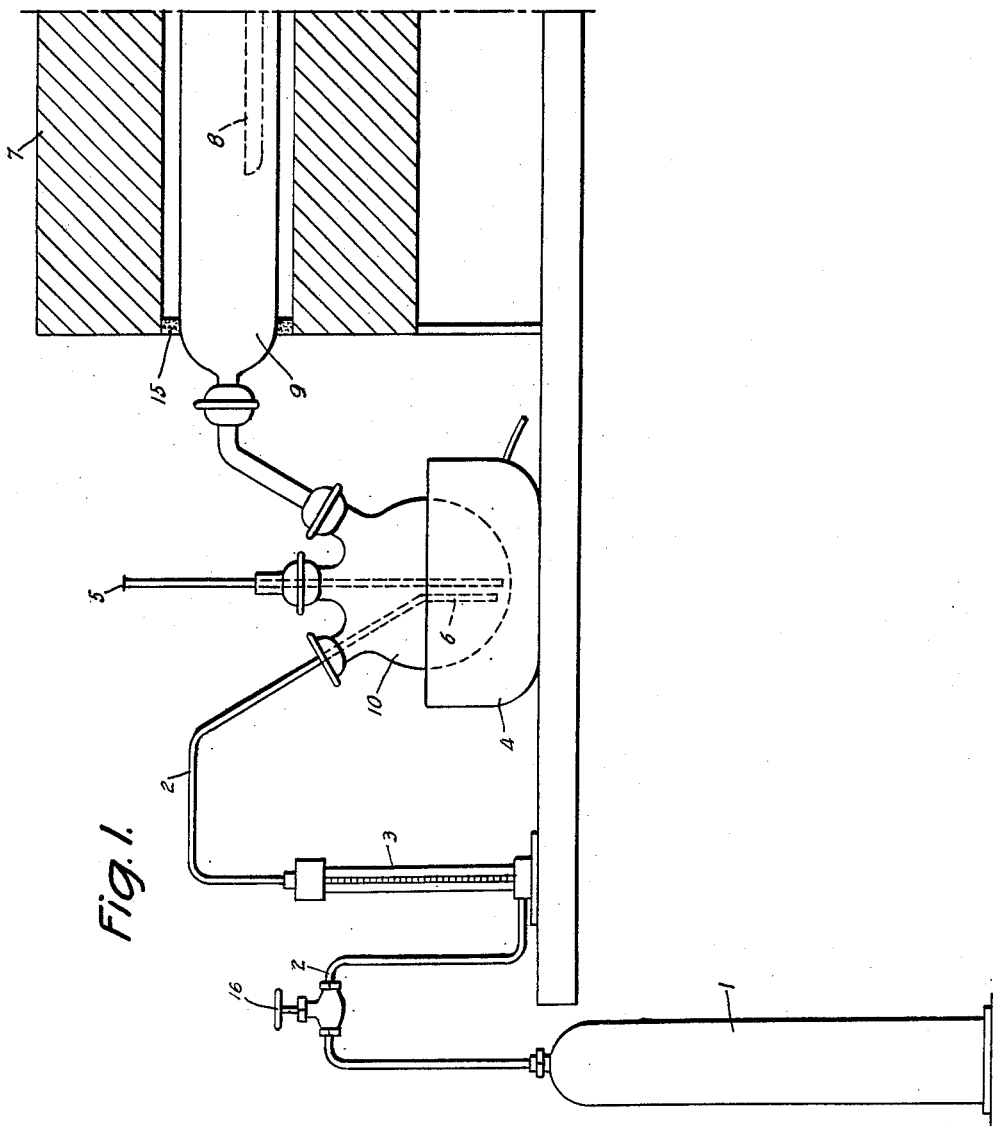
Figure 2:
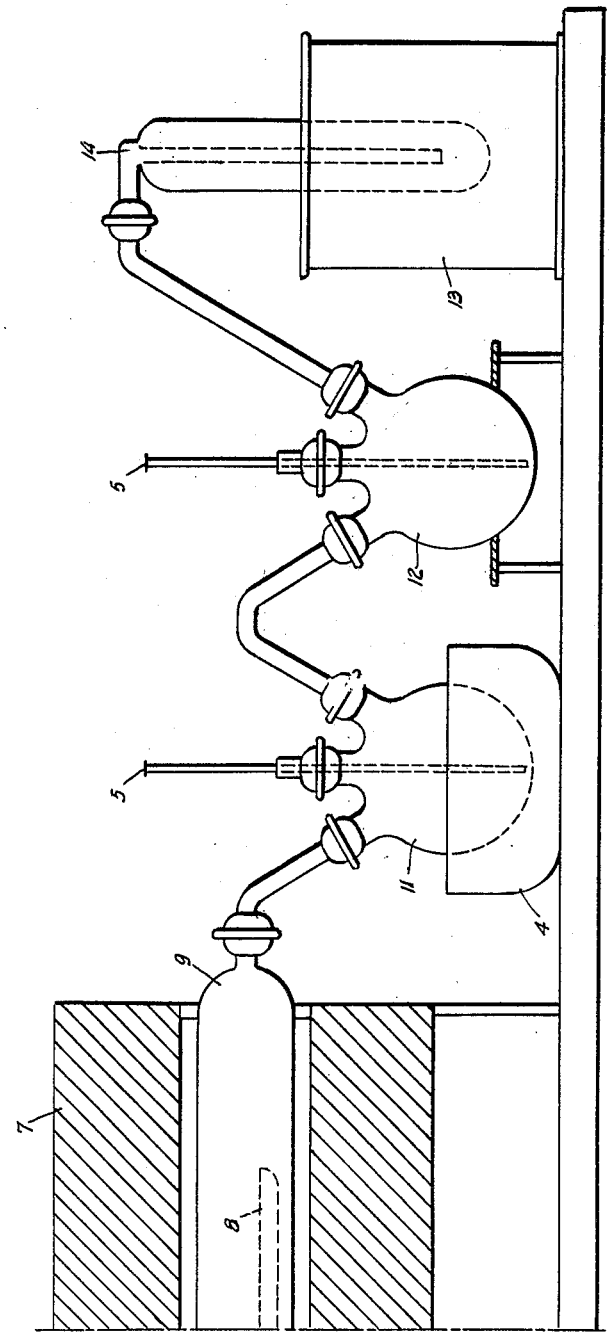

Nov. 24, 1959 H. B. FORMAN 2,914,379
PROCESS FOR THE CHLORINATION OF
ZIRCONIUM-BEARING MATERIALS
Filed July 11, 1955 2 Sheets-Sheet 1

INVENTOR.
Herbert B. Forman
BY
Moses, Nolte, Crews + Berry
ATTORNEYS

United States Patent Office 2,914,379
Patented Nov. 24, 1959

2,914,379

PROCESS FOR THE CHLORINATION OF ZIRCONIUM-BEARING MATERIALS

Herbert B. Forman, Hillside, N.J., assignor to Metal & Thermit Corporation, New York, N.Y., a corporation of New Jersey Application July 11, 1955, Serial No. 520,957

6 Claims. (Cl. 23—87)

This invention relates to a process for producing zirconium tetrachloride from zirconium bearing materials, and more particularly from zircon sands.

Zirconium occurs in zircon sands, principally, in the form of the silicate $ZrSiO_4$ together with minor quantities of other metal salts. $ZrCl_4$ is of great commercial importance as starting materials for producing other zirconium compounds. From $ZrCl_4$ it is possible to make practically all of the commercially important zirconium chemicals. $ZrCl_4$ is also a starting material for zirconium metal manufacture in the Kroll process.

There are two major processes currently in use for the manufacture of zirconium tetrachloride. The first is the chlorination, at 600–900° C., of a carbide and/or cyanonitride of zirconium. These starting materials are the products of a carbon resistor or arc furnace. The second process is a direct chlorination of zircon and carbon briquettes at 800–1000° C. In the second process it is necessary to add oxygen with the chlorine to maintain the reaction zone temperature. These prior art processes are relatively expensive.

It is an object of the present invention to convert the relatively crude zircon to the commercially useful $ZrCl_4$ in high yields.

Other and more detailed objects will be apparent from the following description and claims.

The objects of the present invention are accomplished by reacting the raw material, zircon sand, at elevated temperatures with a mixture of sulfur monochloride vapors and chlorine gas. In place of the sulfur monochloride vapors and chlorine gas mixture, sulfur monochloride vapor alone, a mixture of sulfur dichloride and chlorine gas or sulfur dichloride alone may be employed. A gaseous mixture of sulfur and chlorine may also be employed. As a matter of fact any combination of sulfur and chlorine may be employed, though the point at which these materials enter the reaction zone or the manner in which they may enter may vary.

The precise mechanism of these reactions are not known. However, the over all reactions may be described by the following equations:

(1) $ZrSiO_4 + 3Cl_2 + S_2Cl_2 \rightarrow ZrCl_4 + SiCl_4 + 2SO_2$
(2) $ZrSiO_4 + 4Cl_2 + S_2 \rightarrow ZrCl_4 + SiCl_4 + 2SO_2$
(3) $ZrSiO_4 + 2Cl_2 + 2SCl_2 \rightarrow ZrCl_4 + SiCl_4 + 2SO_2$
(4) $ZrSiO_4 + 2SCl_4 \rightarrow ZrCl_4 + SiCl_4 + 2SO_2$ The reaction between zircon with the sulfur-chlorine reactants above described, and particularly with sulfur mono-chloride and chlorine takes place at a temperature between 700° C. and 1200° C. and preferably between 1000° C. and 1200° C. The optimum temperature of this reaction is about 1200° C.

The crude zircon bearing material may also be converted to the commercially useful $ZrCl_4$, according to the present invention, by first fritting the $ZrSiO_4$ bearing material with soda ash, preferably at about 900° C., to form sodium zirconium silicate ($Na_2ZrSiO_5$) and then reacting this material with the sulfur-chlorine reactants described above. The overall reactions of these processes may be described by the following equations, Equation 5 showing the reactions involved in the fritting process:

(5) $Na_2CO_3 + ZrSiO_4 \rightarrow Na_2ZrSiO_5 + CO_2$
(6) $4Na_2ZrSiO_5 + 20Cl_2 + 5S_2 \rightarrow$
$8NaCl + 4ZrCl_4 + 4SiCl_4 + 10SO_2$
(7) $4Na_2SrSiO_5 + 15Cl_2 + 5S_2Sl_2 \rightarrow$
$8NaCl + 4ZrCl_4 + 4SiCl_4 + 10SO_2$
(8) $2Na_2ZrSiO_5 + 5Cl_2 + 5SCl_2 \rightarrow$
$4NaCl + 2ZrCl_4 + 2SiCl_4 + 5SO_2$
(9) $2Na_2ZrSiO_5 + 5SCl_4 \rightarrow$
$4NaCl + 2ZrCl_4 + 2SiCl_4 + 5SO_2$ The reaction between the sodium zirconium silicate and the sulfur-chlorine reactants described in Equations 6 to 9 and particularly the reaction with a mixture of sulfur monochloride and chlorine is preferably carried out at a temperature between 700° C. and 900° C.

A third method for accomplishing the objects of the present invention is fritting the $ZrSiO_4$ bearing material with soda ash as described above and then extracting the frit with a dilute acid solution, preferably $H_2SO_4$ to remove the $Na_2O$ in $Na_2ZrSiO_5$. A reactive residue is obtained which is dried, preferably, at about 900° C. The reactions taking place in this procedure may be described by the following equations:

(10) $Na_2CO_3 + ZrSiO_4 \rightarrow Na_2ZrSiO_5 + CO_2$
(11) $Na_2ZrSiO_5 + H_2SO_4 \rightarrow$
$Na_2SO_4 + H_2O + ZrSiO_4$ The $ZrSiO_4$ obtained in this process may also be reacted according to Equations 1 to 4 above.

The neutralized frit i.e. the reactive residue remaining after the acid extraction of the sodium zirconium silicate and drying, is reacted with the sulfur-chlorine reactants, particularly the sulfur monochloride-chlorine reactant at a temperature within the range of about 600° C. to 700° C.

Zircon may also be reacted with caustic soda at about 600° C., according to the present invention, to form $Na_2ZrSiO_5$. In a similar manner as described above this reaction product may further be reacted with the above described sulfur-chlorine reactant. This reaction has an advantage in that the zircon does not have to be ground. Similarly the caustic soda-zircon reaction product may first be extracted with dilute acid, as described supra, to remove the soda and then further reacted with the above defined sulfur-chlorine reactants.

In the above reactions involving the frit or the neutralized frit it is best to use ceramic equipment because of the corrosive nature of the reaction mixture.

Although emphasis has been placed on the recovery of $ZrCl_4$ from the process of the present invention it must be mentioned that $SiCl_4$, also a commercially useful reactant, is also produced and recovered in substantial amounts by the process of this invention.

The process of the present invention may be carried out by passing the heated sulfur-chlorine reactant in gaseous form over a quartz boat maintained in a heated conduit and containing the zircon bearing material. The exit gases are collected using an exit train consisting of a warm condenser, a cool condenser (about room temperature to ice temperature) and a Dry Ice acetone cooled vapor trap. $ZrCl_4$ sublimes at approximately 300° C. and by keeping the first condenser warm (about 150–200° C.) the $ZrCl_4$ collects in the first condenser. Those products whose boiling points are higher than 200° C. also condense and collect in this condenser. Products having a B.P. below 200° C. pass through the first condenser. These products are $SiCl_4$, B.P. 57.6° C., and unreacted SCl, B.P. 59° C., and $S_2Cl_2$, B.P. 136° C. The uncondensed products leaving the first condenser condense in the air-cooled condenser and in the acetone-Dry Ice-cooled vapor trap.

The following examples are further illustrative of the present invention. It is to be understood, however, that this invention is not restricted thereto.

1 designates a cylinder containing chlorine which is connected to rotameter 3 through polyethylene tubing 2. A valve 16 is placed in the line between cylinder 1 and rotameter 3 to regulate the flow of chlorine to the rotameter. Rotameter 3 functions to measure the rate of flow of the chlorine. A 300 ml. 3 neck flask sulfur reactant pot 10 equipped with a heating mantle 4, and a thermometer 5, is connected to rotameter 3 by means of polyethylene tubing 2 which is provided with a gas inlet tube 6. One neck of sulfur reactant pot 10 is connected by means of an elbow joint to a quartz tube 9. Quartz tube 9 is positioned in a Burrell furnace 7 and is provided with a quartz boat 8 to hold the zirconium containing material. Quartz tube 9 is held in place by asbestos packing 15. Quartz tube 9 is connected at its other end by means of an elbow joint to a 3 neck 500 ml. flask 11 which functions as a $ZrCl_4$ receiver. The $ZrCl_4$ receiver 11 is also equipped with a heating mantle 4 and thermometer 5. $ZrCl_4$ receiver 11 is connected through an inverted U tube to a 500 ml. flask 12 which acts as an air condenser. This is also provided with a thermometer 5 and is supported on a stand. Flask 12 is connected to vapor trap 14 which is supported in a vacuum thermos 13. All equipment has semi-ball joints.

The general procedure is as follows. A charge of the zirconium containing material is weighed into the quartz boat and the boat 8 is placed in the quartz tube 9. The sulfur reactant is weighed into the sulfur reactant pot 10 and this section is attached to the quartz tube entrance. The furnace is raised to the desired temperature. When the temperature is set, $Cl_2$ gas is bubbled through the boiling, or near boiling, sulfur reactant. Where the sulfur reactant is a sulfur chloride, nitrogen may be used in place of chlorine.

The amount of sulfur reactant weighed into the sulfur reactant pot is dependent on the particular sulfur reactant employed. Where elemental sulfur is employed 50 grams are weighed into the sulfur reactant pot. In the case of $S_2Cl_2$ 100 grams are used. Where the sulfur reactant is $SCl_2$ 150 grams are employed. In general the amount of sulfur reactant employed is such that it contains a sulfur equivalent of about 50 grams.

The reaction starts immediately as evidenced by $ZrCl_4$ condensing in the exit train. If any appreciable $ZrCl_4$ collects in the exit below from the furnace, the elbow is heated gently with a gas flame sublimation of the $ZrCl_4$ into the receiver. When no more $ZrCl_4$ distills over, the run is complete. For analytical purposes the sulfur reactant pot is removed and $Cl_2$ gas is passed through the equipment for about 15 minutes to remove elemental sulfur. The furnace is cooled, the boat removed and weighed. If necessary, the residue is analyzed and a material balance is calculated.

For analysis, $ZrCl_4$ that collects in the zirconium tetrachloride receiver and elbow leading into the receiver is considered as one fraction and $ZrCl_4$ in the elbow leading into the air condenser is another fraction. The main difference in analysis of these two fractions is the sulfur content.

As noted above the first receiver 11 is a warm condenser and is maintained at a temperature of about 150–200° C. The second condenser 12 is a cool condenser kept at a temperature of room temperature to ice temperature. The vapor trap 13 is cooled by a Dry Ice-acetone mixture.

The crude $ZrCl_4$ collected in the air receivers can be purified by distilling the impurities in an atmosphere of $Cl_2$ and then subliming the $ZrCl_4$ in a $Cl_2$ atmosphere.

*Example 1.*—A porcelain boat containing 30 gms. of zircon sand was placed in the furnace at 1200° C. Chlorine gas was bubbled through molten sulfur at the rate of 100–150 standard cc./min. and the vapors passed over the boat for about 5 hours. After this, chlorine gas alone was passed over the boat at the same rate for about one hour. The volatile products of reaction were collected at the exit.

*Example 2.*—A porcelain boat containing 30 gms. of zircon sand was placed in the furnace at 1200° C. Chlorine and sulfur dichloride vapors were passed over the boat at the rate of 100–150 standard cc./min. of $Cl_2$ and about 50 standard cc/min. of $SCl_2$ for about 5 hours. After this, chlorine gas was passed over the boat at the same rate for about one hour. The volatile products of reaction were collected at the exit.

*Example 3.*—A porcelain boat containing 30 gms. of zircon sand was placed in a furnace at 1200° C. Chlorine gas and sulfur vapors were passed over the boat at the rate of 100–150 standard cc./min. of $Cl_2$ and 50 to 60 standard cc./min. of $S_2$ for about 5 hours. The sulfur vapors were introduced by passing dry nitrogen through molten sulfur. After this, chlorine gas alone was passed over the boat at the same rate for about one hour. The volatile products of reaction were collected at the exit.

*Example 4.*—A porcelain boat containing 30 gms. of zircon sand was placed in a furnace at 1200° C. Nitrogen was bubbled through sulfur monochloride at the rate of about 50 standard cc./min. and the vapors passed over the boat for about 5 hours. The volatile products of reaction were collected at the exit.

*Example 5.*—A porcelain boat containing 30 gms. of zircon sand was placed in a furnace at 1200° C. Nitrogen was bubbled through sulfur dichloride at the rate of about 50 standard cc./min. and the vapors passed over the boat for about 5 hours. The volatile products of reaction were collected at the exit.

*Example 6.*—A porcelain boat containing 30 gms. of zircon sand was placed in a furnace at 1200° C. Chlorine and sulfur monochloride vapors were passed over the boat for about 5 hours at the rate of 100–150 standard cc./min. of $Cl_2$ and 25–30 standard cc./min. of $S_2Cl_2$. After this, chlorine gas alone was passed over the boat at the same rate for about one more hour. The volatile products of reaction were collected in this manner at the exit end.

*Example 7.*—A similar reaction to that of Example 1 took place at a temperature of 1000° C.

In Table I below is given typical data on the percentage of zircon sand reacted following the process of the present invention. The percent reacted is determined by the weight losses of the zircon in the quartz boat and the analysis of the charge. The particular data in Table I represent the results from runs wherein the chlorinating reactant is a mixture of chlorine and sulfur monochloride. The weight of the charge of zircon sand and the temperature maintained during the reaction are indicated in the appropriate places in the table. In these cases 100 grams of sulfur monochloride is weighed into the sulfur reactant pot and this section is attached to the quartz tube wherein the quartz boat containing a weighed amount of zircon sand is placed. The furnace is raised to the desired temperature. When the temperature is set, $Cl_2$ gas is bubbled through boiling or near boiling, sulfur monochloride. In this procedure $Cl_2$ passes over the boat at the rate of 100–150 standard cc./min. and $S_2Cl_2$ at the rate of 25–30 standard cc./min, The crude $ZrCl_4$ is collected in the exit trains,

Table I

| Run No. | Temp., °C. | Charge in gms. of Zircon | Percent Reacted |
|---|---|---|---|
| 1 | 1,200 | 14.22 | 97.8 |
| 2 | 1,000 | 7.76 | 66.0 |
| 3 | 1,200 | 9.43 | 97.6 |
| 4 | 1,200 | 70.6 | 94.5 |
| 5 | 1,200 | 35.2 | 99.4 |
| 6 | 900 | 6 | 27.8 |
| 7 | 700 | 16 | 15.0 |

Table II below gives the data on the typical analysis of the crude $ZrCl_4$ collected in the exit trains of a few of the runs shown in Table I. Theoretical analysis of pure $ZrCl_4$ is also given for purposes of comparison.

Table II

| Run No. | Percent $ZrO_2$ | Percent Cl | Percent $SiO_2$ | Percent S |
|---|---|---|---|---|
| Theoretical | 52.1 | 61 | | |
| 1 | 24.6 | 64.92 | 0.09 | 6.26 |
|   | 35.92 | 41.93 | 0.07 | .20 |
| 4 | 48.93 | 61.87 | 0.043 | 2.31 |
|   | 33.24 | 61.36 | 0.13 | 7.45 |
| 5 | 52.36 | 63.61 | trace | 0.6 |

*Example 8.*—One part zircon was fritted with a slight excess of sodium carbonate for about one hour at a minimum temperature of 900° C. The fritted mass was ground and then reacted at 700° C. with a mixture of sulfur monochloride and chlorine vapors. After a reaction time of about three hours, chlorine gas only was passed through for an additional hour. In this manner, the volatile products of reaction were removed and collected in a receiver at the exit side.

*Example 9.*—A similar run to that of Example 8 was made at 900° C. Some of the volatile products of reaction were condensed and collected.

*Example 10.*—The procedure of Example 1 was followed excepting that the fritted zircon of Example 8 was used in place of the zircon sand of Example 1 and the temperature was maintained at 700° C. Crude $ZrCl_4$ was collected in the exit train.

*Example 11.*—The procedure of Example 2 was followed excepting that the fritted zircon of Example 8 was used in place of the zircon sand of Example 2 and the temperature was maintained at 700° C. Crude $ZrCl_4$ was collected in the exit train.

*Example 12.*—The procedure of Example 3 was followed excepting that the fritted zircon of Example 8 was used in place of the zircon sand of Example 3 and the temperature was maintained at 700° C. Crude $ZrCl_4$ was collected in the exit train.

*Example 13.*—The procedure of Example 4 was followed excepting that the fritted zircon of Example 8 was used in place of the zircon sand of Example 4 and the temperature was maintained at 700° C. Crude $ZrCl_4$ was collected in the exit train.

*Example 14.*—Procedure of Example 5 was followed excepting that the fritted zircon of Example 8 was used in place of the zircon sand of Example 5 and the temperature was maintained at 700° C. Crude $ZrCl_4$ was collected in the exit train.

In Table III below is given typical data on the percentage of fritted zircon reacted following the process of the present invention. Here again the percent reacted is determined by the weight losses of the fritted zircon in the quartz boat and the analysis of the charge. The particular data in Table III represents the results from runs wherein the chlorinating reactant is a mixture of chlorine and sulfur monochloride. The procedure is the same as that for the runs in Table I. The fritted zircon of Example 8, however, is used in place of the zircon sand of Table I. The weight of the charge and the temperature maintained in the reaction are indicated in this table.

Table III

| Run No. | Temp., °C. | Charge, Gms. | Percent $ZrO_2$ Reacted | Percent $SiO_2$ Reacted |
|---|---|---|---|---|
| 1 | 930 | 22.73 | 70.4 | |
| 2 | 700 | 20.90 | 59 | 19.1 |
| 3 | 700 | 4 | 85.3 | 6.15 |
| 4 | 900 | 4.97 | 72.5 | 77.2 |
| 5 | 500 | 5.28 | slight reaction | |

*Example 15.*—One part of zircon was fritted with a slight excess of sodium carbonate for about one hour at a minimum temperature of about 900° C. Without grinding the frit, it was extracted with dilute $H_2SO_4$ to remove the majority of the $Na_2O$ in $Na_2ZrSiO_5$. A reactive residue is obtained. This material is dried at approximately 900° C. and is used for further reaction. It is referred to as neutralized frit.

*Example 16.*—The procedure of Example 1 was followed excepting that the neutralized frit of Example 15 was used in place of the zircon sand of Example 1 and the temperature was maintained at 600° C. Crude $ZrCl_4$ was collected in the exit train.

*Example 17.*—The procedure of Example 2 was followed excepting that the neutralized frit of Example 15 was used in place of the zircon sand of Example 2 and the temperature was maintained at 600° C. Crude $ZrCl_4$ was collected in the exit train.

*Example 18.*—The procedure of Example 3 was followed excepting that the neutralized frit of Example 15 was used in place of the zircon sand in Example 3 and the temperature was maintained at 600° C. Crude $ZrCl_4$ was collected in the exit train.

*Example 19.*—The procedure of Example 4 was followed excepting that the neutralized frit of Example 15 was used in place of the zircon sand in Example 4, and the temperature was maintained at 600° C. Crude $ZrCl_4$ was collected in the exit train.

*Example 20.*—The procedure of Example 5 was followed excepting that the neutralized frit of Example 15 was used in place of the zircon sand of Example 5 and the temperature was maintained at 600° C. Crude $ZrCl_4$ was collected in the exit train.

*Example 21.*—The procedure of Example 6 was followed excepting that the neutralized frit of Example 15 was used in place of the zircon sand of Example 6 and the temperature was maintained at 600° C. Crude $ZrCl_4$ was collected in the exit train.

In Table IV below is given typical data on the percentages of neutralized frit reacted by the process of the present invention. As in Table I and III, the percent reacted is determined by the weight losses of the neutralized frit in the quartz boat and the analysis of the charge. The procedure is the same as for the data appearing in Tables I and II excepting that the zircon material used is the neutralized frit of Example 15. The weight of the charge and the temperatures used are indicated in the table.

Table IV

| Run No. | Temp., °C. | Charge, gms. | Percent ZrO Reacted | Percent $SiO_2$ Reacted |
|---|---|---|---|---|
| 1 | 600 | 20.0 | 94 | 51.7 |
| 2 | 400 | 20.0 | slight reaction | |
| 3 | 600 | 20.0 | 95.8 | 47.5 |
| 4 | 700 | 19.64 | 89.5 | 75.2 |

Table V below shows a typical analysis of the crude $ZrCl_4$ resulting from the runs of Table IV. Particularly an analysis of run 1 of Table IV is given. Theoretical analysis of pure $ZrCl_4$ is given for purposes of comparison.

Table V

| Run No. | Percent ZrO$_2$ | Persent Cl | Percent SiO$_2$ | Percent S |
|---|---|---|---|---|
| Theoretical | 52.1 | 61 | | |
| Run 1 of Table IV | 52.1 | 56.13 | None | 0.027 |

Several specific embodiments of the present invention have been described in detail. However, it is to be understood that many modifications thereof, may be made, within the expected knowledge of one skilled in the art, without departing from the spirit of the invention.

What is claimed is:

1. A process for preparing ZrCl$_4$ comprising chlorinating an alkali fritted zirconium silicate, prepared by fitting zirconium silicate with sodium carbonate, at elevated temperatures above about 700° C. with a gaseous inorganic Cl and S containing chlorinating agents whose active chlorinating constituents are made up only of the elements chlorine and sulfur and condensing ZrCl$_4$ in the exit gases, said elevated temperatures being sufficiently high to effectively convert a significant quantity of said alkali fritted zirconium silicate to ZrCl$_4$.

2. A process according to claim 1, wherein the gaseous inorganic Cl and S containing chlorinating agent is selected from the class consisting of a mixture of sulfur monochloride and chlorine gas, sulfur monochloride, a mixture of sulfur dichloride and chlorine gas, sulfur dichloride, and a gaseous mixture of sulfur and chlorine.

3. A process for preparing ZrCl$_4$ comprising chlorinating an acid neutralized alkali fritted zirconium silicate, prepared by fritting zirconium silicate with sodium carbonate and then leaching with dilute sulfuric acid, at elevated temperatures between about 400° C. and 700° C. with a gaseous inorganic Cl and S containing chlorinating agents whose active chlorinating constituents are made up only of the elements chlorine and sulfur and condensing ZrCl$_4$ in the exit gases, said elevated temperatures being sufficiently high to effectively convert a significant quantity of said acid neutralized alkali fritted zirconium silicate to ZrCl$_4$.

4. The process set forth in claim 3 in which the chlorination is carried out at a temperature between 600° C. and 700° C.

5. A process according to claim 3, wherein the gaseous inorganic Cl and S containing chlorinating agent is selected from the class consisting of a mixture of sulfur monochloride and chlorine gas, sulfur monochloride, a mixture of sulfur dichloride and chlorine gas, sulfur dichloride and, a gaseous mixture of sulfur and chlorine.

6. A process for preparing compounds selected from the group consisting of ZrCl$_4$, SiCl$_4$ and mixtures thereof which comprises chlorinating a zirconium and silicon bearing material selected from the class consisting of alkali fritted zirconium silicate, prepared by fritting zirconium silicate with sodium carbonate, and acid neutralized alkali fritted zirconium silicate, prepared by fritting zirconium silicate with sodium carbonate and then leaching with dilute sulfuric acid, with an inorganic Cl and S containing chlorinating agents whose active chlorinating constituents are made up only of the elements chlorine and sulfur at temperatures of at least 700° C. and recovering the desired chlorinated products, said elevated temperatures being sufficiently high to effectively convert a significant quantity of said zirconium and silicon bearing material to the desired chlorides.

References Cited in the file of this patent

UNITED STATES PATENTS

| 1,527,470 | Cooper | Feb. 24, 1925 |
| 1,535,687 | Ruff | Apr. 28, 1925 |
| 2,036,221 | Kinzie et al. | Apr. 7, 1936 |

OTHER REFERENCES

"Handbooks of Chemistry and Physics," 14th ed., by C. D. Hodman and N. A. Lange, pp. 276, 277, Chem. Rubber Publ. Co., Cleveland, Ohio.

J. W. Mellor's "A Comprehensive Treatise on Inorganic and Theoretical Chem.," vol. 7, pp. 123, 124, 144, and vol. 10, p. 643, Longmans, Green and Co., New York.

FIAT Final Report 774, pages 18–29, May 7, 1946.

Thorpe: "Dictionary of Applied Chemistry," vol. V, pp. 827, 829, publ. 1912 by Longmans, Green and Co., New York, N.Y.